United States Patent
Won

(10) Patent No.: US 10,788,578 B2
(45) Date of Patent: Sep. 29, 2020

(54) ANTENNA PATTERN SYNTHESIZING APPARATUS AND METHOD

(71) Applicant: Korea Aerospace Research Institute, Daejeon (KR)

(72) Inventor: Young Jin Won, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 387 days.

(21) Appl. No.: 15/818,084

(22) Filed: Nov. 20, 2017

(65) Prior Publication Data

US 2018/0164428 A1    Jun. 14, 2018

(30) Foreign Application Priority Data

Dec. 8, 2016 (KR) .................... 10-2016-0166394

(51) Int. Cl.
*G01S 13/90* (2006.01)
*H01Q 3/28* (2006.01)
*H01Q 3/30* (2006.01)

(52) U.S. Cl.
CPC ............ *G01S 13/904* (2019.05); *G01S 13/90* (2013.01); *H01Q 3/28* (2013.01); *H01Q 3/30* (2013.01)

(58) Field of Classification Search
CPC .......... G01S 13/904; G01S 13/90; H01Q 3/28
See application file for complete search history.

(56) References Cited

U.S. PATENT DOCUMENTS

| | | | | |
|---|---|---|---|---|
| 7,636,455 | B2* | 12/2009 | Keaton | G06K 9/0063 348/118 |
| 9,086,484 | B2* | 7/2015 | Medasani | G01S 7/412 |
| 10,361,802 | B1* | 7/2019 | Hoffberg-Borghesani | H04N 21/4755 |
| 2015/0249291 | A1 | 9/2015 | Schmidt et al. | |

FOREIGN PATENT DOCUMENTS

| | | |
|---|---|---|
| KR | 20110058361 A | 6/2011 |
| KR | 20120000842 A | 1/2012 |

OTHER PUBLICATIONS

Array Pattern Synthesis Using Digital Phase Control by Quantized Particle Swarm Optimization, Taisir H. Ismail and Zoubir M. Hamici. IEEE Transactions on Antennas and Propagation, vol. 58, No. 6, Jun. 2010, pp. 2142-2145.
Pattern Synthesis to Which Quantum-Behaved Particle Swarm Optimization Scheme Is Applied. Korean Institute of Electromagnetic Engineering and Science—Publication Date: Dec. 2, 2016.

* cited by examiner

*Primary Examiner* — Marcus E Windrich
(74) *Attorney, Agent, or Firm* — Bond Schoeneck & King, PLLC; George McGuire

(57) ABSTRACT

Provided is an antenna pattern synthesizing apparatus that synthesizes an antenna pattern by applying quantum-behaved particle swarm optimization (QPSO) algorithm of a satellite synthetic aperture radar (SAR), the antenna pattern synthesizing apparatus including a designer configured to design a mask template based on a performance of an SAR system including an antenna array in which a plurality of antennas are arranged in a multidimensional structure, and a generator configured to calculate a signal amplitude and a signal phase for the antenna array to generate a first antenna pattern using QPSO, and generate the first antenna pattern in (Continued)

the designed mask template based on the calculated signal amplitude and the calculated signal phase.

16 Claims, 9 Drawing Sheets

ANTENNA PATTERN SYNTHESIZING APPARATUS AND METHOD

CROSS-REFERENCE TO RELATED APPLICATION(S)

This application claims the priority benefit of Korean Patent Application No. 10-2016-0166394 filed on Dec. 8, 2016, in the Korean Intellectual Property Office, the disclosure of which is incorporated herein by reference for all purposes.

BACKGROUND

1. Field

One or more example embodiments relate to an antenna pattern synthesis technology, and more particularly, to an apparatus for synthesizing an antenna pattern by applying quantum-behaved particle swarm optimization (QPSO) of a satellite synthetic aperture radar (SAR) and a method of controlling the same.

2. Description of Related Art

An SAR is an active electromagnetic wave sensor configured to acquire a high resolution image of a wide region irrespective of a weather condition or day and night. The SAR is mounted on various platforms such as a satellite, an aircraft, and a drone and mainly used for ordinary observation and reconnaissance of a desired region. A recently developed high resolution active phased array SAR system requires various operating modes based on task requirements. An SAR system to acquire a high resolution image requires various operating antenna patterns to satisfy system performance indices such as a noise-equivalent sigma zero (NESZ), an image Swath width, and a radiometric accuracy.

A method to optimize the performance of the SAR system may include an antenna mask template designing and antenna pattern synthesizing method. Conventionally, a method of applying a particle swarm optimization (PSO) algorithm in an antenna pattern synthesizing process has been suggested. The classical PSO algorithm finds a best position based on a velocity vector and a position vector, and exhibits a great performance in optimization of the performance of the SAR system when applied to an antenna pattern synthesis technology. However, the PSO algorithm requires separate calculations with respect to the position vector and the velocity vector, and thus has a limit in being applied to a case in which an antenna pattern is to be generated in real time.

SUMMARY

According to an aspect, there is provided an antenna pattern synthesizing apparatus that synthesizes an antenna pattern by applying a quantum-behaved particle swarm optimization (QPSO) algorithm of a satellite synthetic aperture radar (SAR). The antenna pattern synthesizing apparatus may include a designer configured to design a mask template based on a performance of an SAR system including an antenna array in which a plurality of antennas are arranged in a multidimensional structure, and a generator configured to calculate a signal amplitude and a signal phase for the antenna array to generate a first antenna pattern using QPSO, and generate the first antenna pattern in the designed mask template based on the calculated signal amplitude and the calculated signal phase.

The generator may include an initializer configured to determine an arrangement size of the antenna array corresponding to the first antenna pattern and at least one entity, and initialize a position vector with respect to the at least one entity, and a setter configured to set a local position and a global position with respect to the at least one entity using the QPSO.

The generator may be configured to calculate a best position value of the at least one entity based on the local position and the global position, and calculate the signal amplitude and the signal phase of the antenna array corresponding to the first antenna pattern based on the best position value of the at least one entity.

The generator may be configured to calculate a cost function by comparing the mask template to the first antenna pattern, and determine the first antenna pattern to be a final antenna pattern when a result of the calculation satisfies a predesignated condition.

In this example, the cost function may be calculated based on a sum of excesses of the first antenna pattern over an upper mask and a lower mask of the mask template.

The predesignated condition may include at least one of a preset calculation iteration number and a preset target result value with respect to the cost function.

The generator may be configured to reset a position vector with respect to at least one entity included in the antenna array when the result of the calculation does not satisfy the predesignated condition, and calculate the signal amplitude and the signal phase with respect to the antenna array based on the reset position vector.

The generator may be configured to iteratively calculate the cost function until the result of the calculation satisfies the predesignated condition.

According to another aspect, there is provided an antenna pattern synthesizing method that synthesizes an antenna pattern by applying a QPSO algorithm of a satellite SAR. The antenna pattern synthesizing method may include designing a mask template based on a performance of an SAR system including an antenna array in which a plurality of antennas are arranged in a multidimensional structure, calculating a signal amplitude and a signal phase for the antenna array to generate a first antenna pattern using QPSO, and generating the first antenna pattern in the designed mask template based on the calculated signal amplitude and the calculated signal phase.

The calculating may include determining an arrangement size of the antenna array corresponding to the first antenna pattern and at least one entity, and initializing a position vector with respect to the at least one entity, and setting a local position and a global position with respect to the at least one entity using the QPSO.

In this example, the calculating may include calculating a best position value of the at least one entity based on the local position and the global position, and calculating the signal amplitude and the signal phase of the antenna array corresponding to the first antenna pattern based on the best position value of the at least one entity.

The generating may include calculating a cost function by comparing the mask template to the first antenna pattern, and determining the first antenna pattern to be a final antenna pattern when a result of the calculation satisfies a predesignated condition.

Here, the cost function may be calculated based on a sum of excesses of the first antenna pattern over an upper mask and a lower mask of the mask template, and the predesignated condition may include at least one of a preset calculation iteration number and a preset target result value with respect to the cost function.

The generating may include resetting a position vector with respect to at least one entity included in the antenna array when the result of the calculation does not satisfy the predesignated condition, and calculating the signal amplitude and the signal phase with respect to the antenna array based on the reset position vector. The generating may include iteratively calculating the cost function until the result of the calculation satisfies the predesignated condition.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
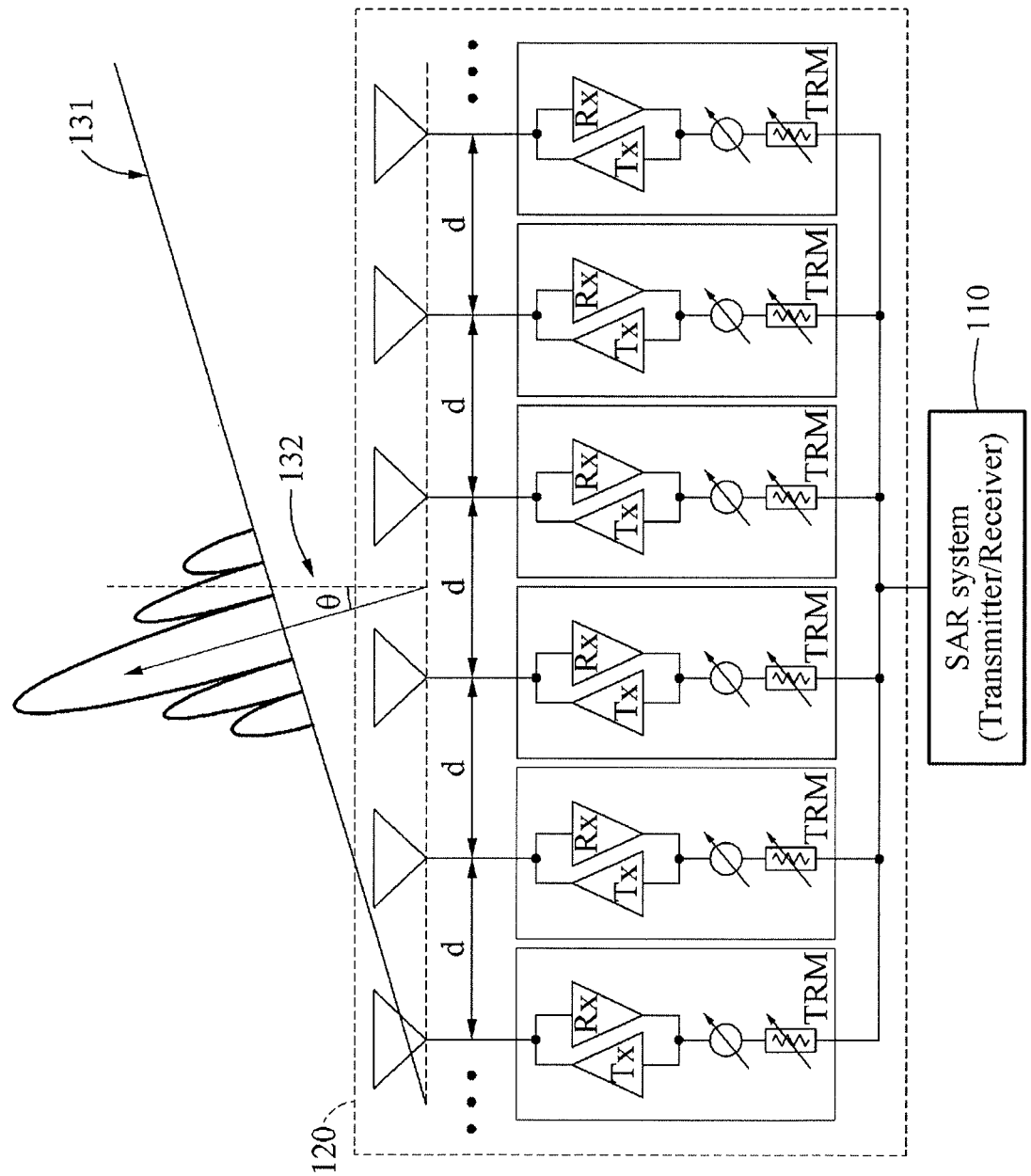
FIG. 1 is a diagram illustrating a general phased array antenna structure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Though the present invention may be variously modified and have several embodiments, specific embodiments will be shown in drawings and be explained in detail. However, the present disclosure is not meant to be limited, but it is intended that various modifications, equivalents, and alternatives are also covered within the scope of the claims.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

In case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, reference will now be made in detail to the example embodiments, examples of which are illustrated in the accompanying drawings, wherein like reference numerals refer to the like elements throughout.

FIG. 1 is a diagram illustrating a general phased array antenna structure.

A synthetic aperture radar (SAR) satellite is a satellite that receives signals that are transmitted from radar antennas and return after reaching the ground, and generates an image through signal processing on the ground. The SAR satellite broadly includes an active or phased array type SAR and a passive or reflector antenna type SAR. Research and development for the active or phased array type SAR that may efficiently generate a desired antenna pattern is more actively conducted.

The active or phased array type SAR is implemented using a phased array antenna that may obtain a desired antenna pattern by adjusting a signal amplitude and a signal phase of an array antenna. A general structure thereof is shown in FIG. 1.

Referring to FIG. 1, an antenna array 120 in which a plurality of antennas are arranged in a multidimensional structure may be mounted on an SAR system 110 to generate an antenna pattern by adjusting a signal amplitude and a signal phase. Antenna entities constituting the antenna array 120 may each include an amplifier for transmission/reception, a phase shifter, and an attenuator. To generate a desired antenna pattern, the antenna array 120 may calculate a best signal amplitude and a best signal phase corresponding to the antenna pattern, and adjust each arrangement position of the antenna array 120 based on the calculated signal amplitude and the calculated signal phase by adjusting a steering angle 132 based on a phase plane 131. Further, in the process of obtaining the antenna pattern desired by the antenna array 120, an antenna mask template that satisfies a performance or a specification of the SAR system 110 including the antenna array 120 needs to be designed in advance. When generating the desired antenna pattern by adjusting the antenna arrangement position based on the calculated signal amplitude and the calculated signal phase, the antenna array 120 may optimize the performance of the SAR system 110 by synthesizing the antenna pattern with the predesigned antenna mask template. The antenna mask template may be designed as shown in FIG. 2.

Figure 2:
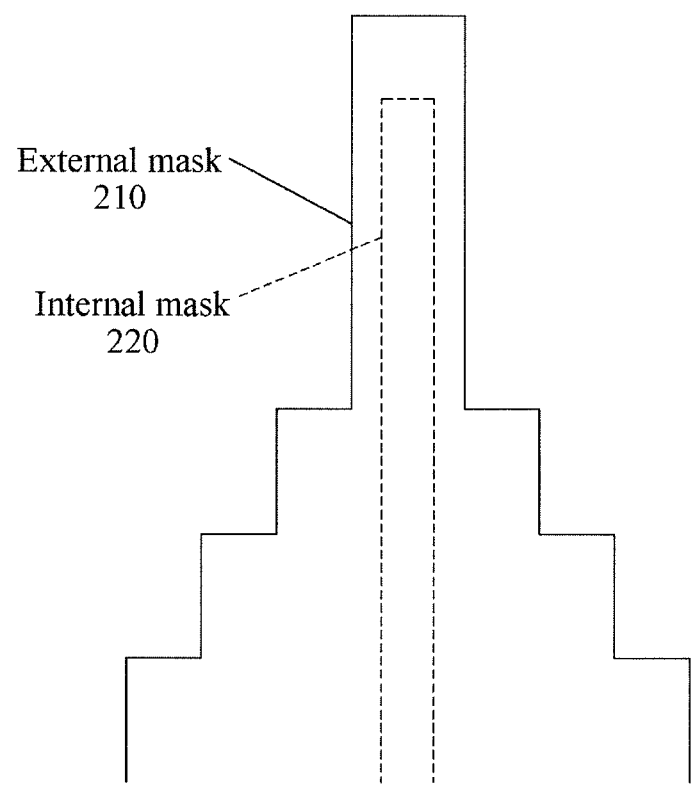
FIG. 2 is a diagram illustrating an antenna mask template designed according to an example embodiment.

FIG. 2 is a diagram illustrating an antenna mask template designed according to an example embodiment.

An antenna mask template may be designed for an antenna array to generate a best antenna pattern based on a performance or a specification of an SAR system including the antenna array. The antenna mask template may include an external mask 210 and an internal mask 220. The antenna pattern generated by the antenna array needs to be synthesized between the external mask 210 and the internal mask 220 so as to be optimized to the performance of the SAR system. For this, each arrangement position of the antenna array needs to be adjusted by optimizing a signal amplitude and a signal phase through iterative performance of position setting for each antenna entity and antenna pattern generation.

Figure 3:
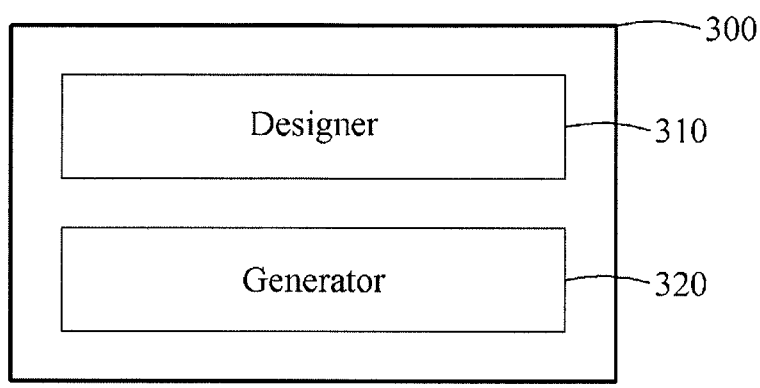
FIG. 3 is a block diagram illustrating an antenna pattern synthesizing apparatus according to an example embodiment.

FIG. 3 is a block diagram illustrating an antenna pattern synthesizing apparatus 300 according to an example embodiment.

The antenna pattern synthesizing apparatus 300 is a device mounted on an SAR system to generate an antenna pattern. The antenna pattern synthesizing apparatus 300 optimizes a signal amplitude and a signal phase to generate an antenna pattern satisfying a mask template based on a performance of the SAR system. For this, the antenna pattern synthesizing apparatus 300 may apply a quantum-behaved particle swarm optimization (QPSO) algorithm with an improved pattern synthesis convergence rate, when compared to a conventional classical particle swam optimization (PSO) algorithm, to the process of optimizing the signal amplitude and the signal phase, thereby improving a rate and an efficiency of real-time antenna pattern generation. The antenna pattern synthesizing apparatus 300 may include a designer 310 and a generator 320.

The designer 310 may design a mask template based on a performance of an SAR system including an antenna array in which a plurality of antennas are arranged in a multidimensional structure.

The generator 320 may calculate a signal amplitude and a signal phase for the antenna array to generate a first antenna pattern using QPSO, and generate the first antenna pattern in the designed mask template based on the calculated amplitude and the calculated phase. In this example, the generator 320 may include an initializer (not shown) and a setter (not shown). The initializer may determine an arrangement size of the antenna array corresponding to the first antenna pattern and at least one antenna entity, and initialize a position vector with respect to the at least one antenna entity. The setter may set a local position and a global position with respect to the at least one antenna entity using the QPSO. The generator 320 may calculate a best position value of the at least one antenna entity based on the local position and the global position set by the setter, and calculate the signal amplitude and the signal phase of the antenna array corresponding to the first antenna pattern based on the best position value of the at least one antenna entity.

Further, the generator 320 may calculate a cost function by comparing the mask template designed by the designer 310 to the first antenna pattern, and determine the first antenna pattern to be a final antenna pattern when a result of the calculation satisfies a predesignated condition. Here, the cost function may be calculated based on a sum of excesses of the first antenna pattern over an upper mask and a lower mask of the mask template. The upper mask and the lower mask may be construed as the external mask 210 and the internal mask 220 of FIG. 2, respectively. In addition, the predesignated condition may include at least one of a preset calculation iteration number and a preset target result value with respect to the cost function. When the result of the calculation satisfies either of the two conditions, the first antenna pattern may be determined to be a best antenna pattern, and thus determined to be the final antenna pattern. However, in a case in which the result of the calculation does not satisfy the predesignated condition, a position vector with respect to at least one antenna entity included in the antenna array may be reset, and the signal amplitude and the signal phase with respect to the antenna array may be recalculated based on the reset position vector. The generator 320 may iteratively perform setting of the position vector, calculating of the signal amplitude/the signal phase, and calculating of the cost function until the result of the calculation satisfies the predesignated condition, thereby optimizing the antenna pattern generated by the antenna array more to the mask template.

The antenna pattern synthesizing apparatus 300 may improve an antenna pattern synthesis rate by applying the QPSO that performs optimization only based on a position of an antenna entity without using a velocity vector, when compared to the conventional PSO that initializes and updates a position vector and a velocity vector of an antenna entity in an antenna pattern synthesizing process. Thus, in a time-restricted situation, for example, in which an on-board SAR controller of an SAR satellite is to generate antenna pattern in real time or is to regenerate an antenna pattern because an error occurs in a portion of antenna entities, a real-time antenna pattern synthesis may be performed relatively quick.

Figure 4:
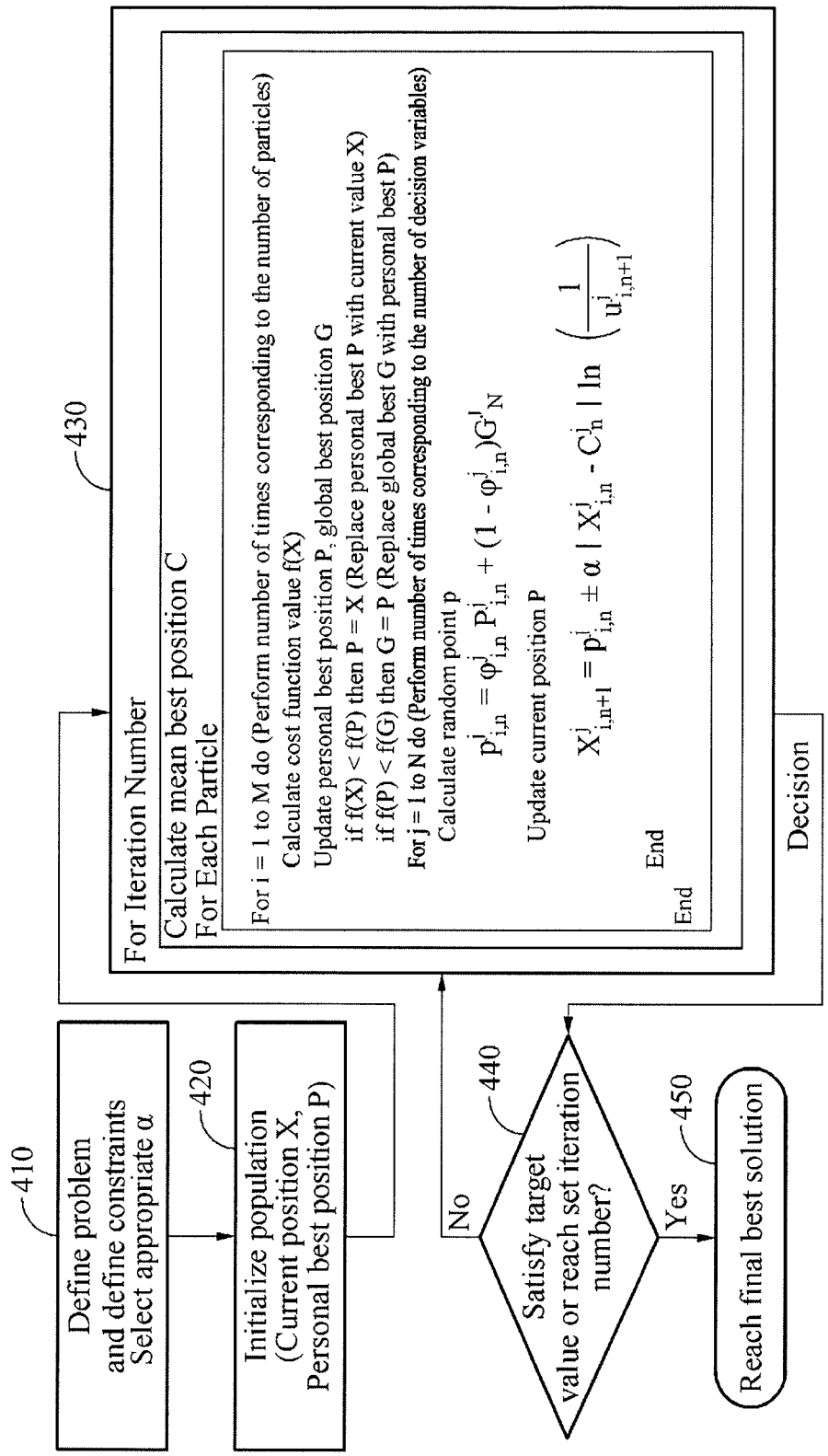
FIG. 4 is a diagram illustrating an algorithm using quantum-behaved particle swarm optimization (QPSO)

FIG. 4 is a diagram illustrating an algorithm using QPSO.

For an antenna array mounted on an SAR system to generate an antenna pattern satisfying an antenna mask template designed based on a performance of the SAR system, conventional PSO applied in an antenna pattern synthesizing process may perform a calculation by assigning separate vector operators to a position vector and a velocity vector to be calculated from the position vector. Conversely, QPSO may use an equation calculated from a predetermined position p on a hyperplane of a mean best position C which denotes a mean of personal best positions, a personal best position P, and a global best position G without using a separate velocity vector, and thus may not require a separate velocity vector. Further, the QPSO may add only a process of calculating C and p from P and G to the conventional PSO algorithm, and thus have advantages of a relatively simple calculation and an improved memory use efficiency, when compared to the process of performing a calculation by assigning a separate velocity vector. Differences between the conventional PSO and the QPSO are shown in the following Table 1.

TABLE 1

| Algorithm | Item | Description |
| --- | --- | --- |
| Conventional PSO | Related equation | $V_{i,n+1}^j = wV_{i,n}^j + c_1 r_{i,n}^j (P_{i,n}^j - X_{i,n}^j) + c_2 R_{i,n}^j (G_n^j - X_{i,n}^j)$<br>$X_{i,n+1}^j = X_{i,n}^j + V_{i,n+1}^j$ |

TABLE 1-continued

| Algorithm | Item | Description |
|---|---|---|
| | Operator | Generate particle (X, V vector), Update velocity vector V, Finally update position vector X |
| | Detailed parameter | Acceleration coefficient c1, c2 Inertia weights w |
| | Remarks | Require velocity vector V |
| QPSO | Related equation | $X_{i,n+1}^{j} = p_{i,n}^{j} \pm \alpha \lvert X_{i,n}^{j} - C_n^{j} \rvert \ln\left(\dfrac{1}{u_{i,n+1}^{j}}\right)$ $C_n^i = \left(\dfrac{1}{M}\right)\sum_{i=1}^{M} P_{i,n}^{j}$ |
| | Operator | $p_{i,n}{}^j = \varphi_{i,n}{}^j p_{i,n}{}^j + (1 - \varphi_{i,n}{}^j) G_n{}^j$ Generate particle (X, P), Calculate mean best position C, Finally update position vector X |
| | Detailed parameter | Contraction expansion coefficient α |
| | Remarks | Not require velocity vector V |

In the QPSO algorithm of Table 1, a contraction expansion coefficient α has a positive real value. By adjusting α in a process of obtaining a global best position, a proportion with respect to a global search or a local search may be adjusted, and furthermore a convergence performance of obtaining the global best position may improve.

Referring to Table 1, the QPSO algorithm may simplify an implementation process by removing an equation related to a velocity vector from the PSO algorithm. Further, the QPSO is an algorithm based on quantum behavior, and thus may perform a search in a global solution space including a wider search region in the process of obtaining a best value through adjustment of α, and differently set parameters based on a complexity of a mask template, thereby improving the performance to obtain a global best position at a high speed, when compared to the conventional PSO algorithm. A detailed operation of the QPSO algorithm may be performed as shown in FIG. 4.

In a case of using the QPSO algorithm as shown in FIG. 4, a target problem may be defined first, and constraints such as α may be defined based on the defined problem, in operation 410. A population of a personal best position P and a current position X may be initialized, in operation 420. A mean best position C may be calculated based on an iteration number preset by the QPSO algorithm, and a global best position G may be determined by applying the QPSO algorithm with respect to each entity, in operation 430. Whether a result of operation 430 satisfies a set target value or reaches a preset iteration number may be determined, in operation 440. When the above condition is satisfied, it may be determined that a final best solution is obtained, in operation 450, and the algorithm may be terminated. In a case in which the above condition is not satisfied, operation 430 may be iteratively performed until the result of operation 430 satisfies the set target value or reaches the preset iteration number.

Figure 5:
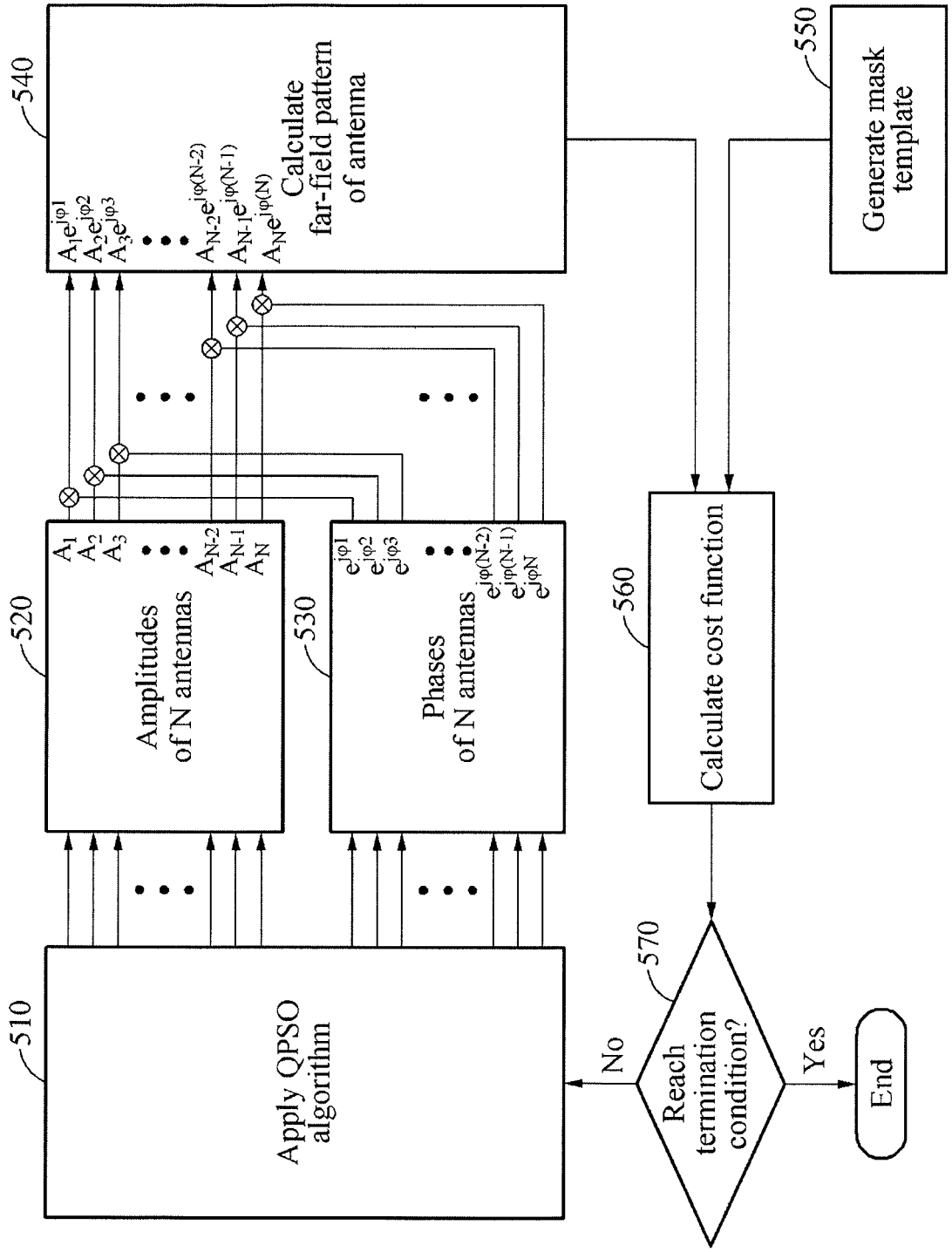
FIG. 5 is a diagram illustrating an antenna pattern synthesizing process using QPSO according to an example embodiment.

FIG. 5 is a diagram illustrating an antenna pattern synthesizing process using QPSO according to an example embodiment, in detail, a process of synthesizing a pattern of a phased array antenna through solutions obtained in the operations using the QPSO algorithm of FIG. 4.

Figure 6A:
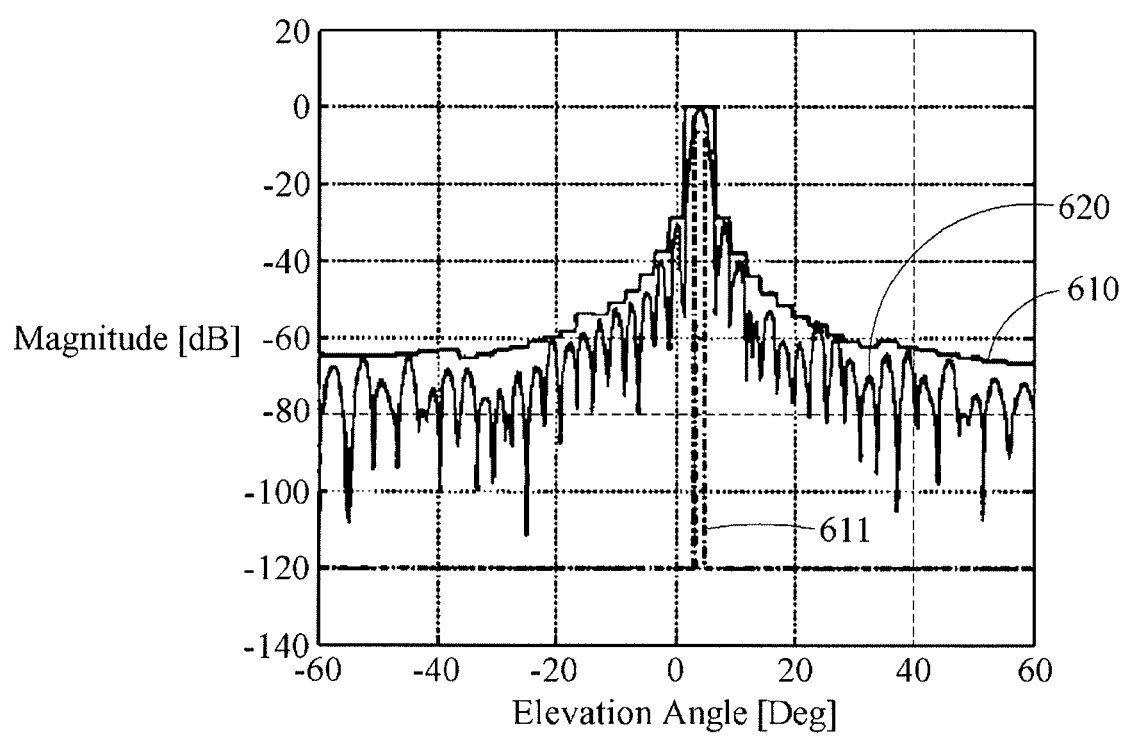
FIGS. 6A through 6C are graphs illustrating an antenna pattern synthesizing result, a best amplitude, and a best phase according to an example embodiment.

Operation 430 of FIG. 4 may be iteratively performed until a condition preset according to the antenna pattern synthesizing process of FIG. 5 is satisfied. When the QPSO algorithm is applied in operation 510, signal amplitudes and signal phases may be calculated with respect to N antenna entities constituting an antenna array using a global best position obtained by performing operation 430 one time as an input value, in operations 520 and 530. In operation 540, a far-field pattern may be generated based on the signal amplitudes and the signal phases with respect to the antenna entities. In operation 560, a cost function may be calculated by comparing the generated pattern to a mask template generated in operation 550. The mask template and the generated pattern may be synthesized as shown in FIG. 6A. In FIG. 6A, an antenna pattern 620 generated through optimization using the QPSO algorithm may be generated in a mask template 610, 611 generated in advance. The cost function may be calculated based on a sum of an excess of the antenna pattern 620 over the upper mask 610 of the mask template and an excess of the antenna pattern 620 over the lower mask 611 of the mask template, as expressed by Equation 1.

Cost Function=10 log($\Sigma$|Upper$_{excess}$|+$\Sigma$|Lower$_{excess}$|) [Equation 1]

Whether a result of the calculation satisfies a set target value or whether the cost function is calculated a number of times corresponding to a preset iteration number may be determined, in operation 570. When the above condition is satisfied, the algorithm may be terminated. When the above condition is not satisfied, the algorithm may be iteratively performed until the condition is satisfied.

Figure 6B:
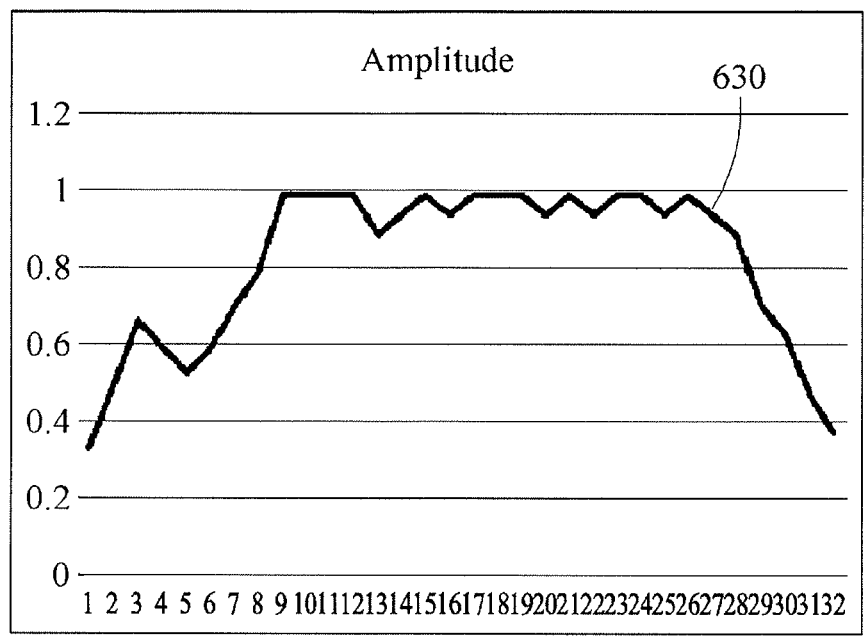
Figure 6C:
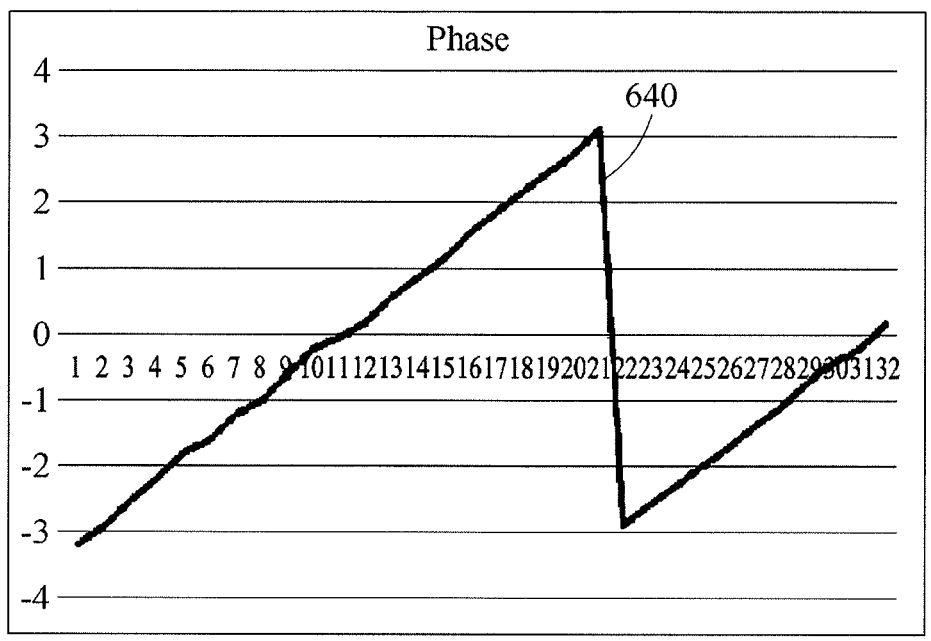

An antenna pattern as shown in FIG. 6A may be finally generated by applying a best signal amplitude and a best signal phase of the antenna array obtained by the antenna pattern synthesizing process of FIG. 5. Further, FIGS. 6B and 6C are graphs illustrating best values obtained by applying the antenna pattern synthesizing process of FIG. 5 to a 32-antenna array, in detail, signal amplitude information 630 optimized with respect to the antenna array and signal phase information 640 optimized with respect to the antenna array.

Figure 7:
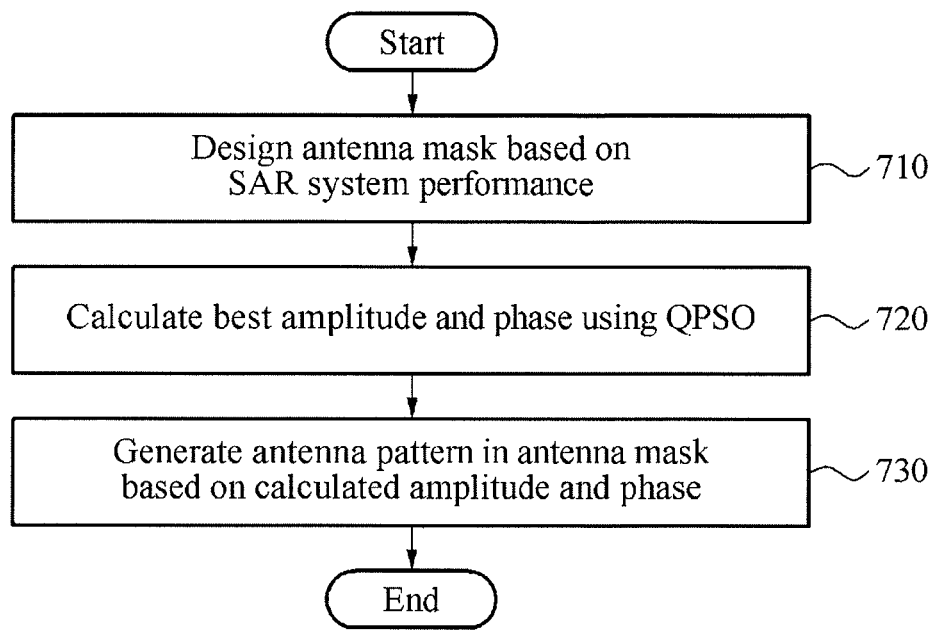
FIG. 7 is a flowchart illustrating an antenna pattern synthesizing method according to an example embodiment.

FIG. 7 is a flowchart illustrating an antenna pattern synthesizing method according to an example embodiment An antenna pattern synthesizing apparatus may be mounted on an SAR system, and provide a method of optimizing a signal amplitude and a signal phase to generate an antenna pattern satisfying a mask template designed based on a performance of the SAR system in a process of generating an antenna pattern.

In operation 710, a designer of the antenna pattern synthesizing apparatus may design a mask template based on a performance of an SAR system including an antenna array in which a plurality of antennas are arranged in a multidimensional structure.

In operation 720, a generator of the antenna pattern synthesizing apparatus may calculate a signal amplitude and a signal phase for the antenna array to generate a first antenna pattern using QPSO. In operation 720, the generator may determine an arrangement size of the antenna array corresponding to the first antenna pattern and at least one antenna entity, initialize a position vector with respect to the at least one antenna entity, and set a local position and a global position with respect to the at least one antenna entity using the QPSO. Further, the generator may calculate a best position value of the at least one antenna entity based on the local position and the global position, and calculate the signal amplitude and the signal phase of the antenna array corresponding to the first antenna pattern based on the best position value of the at least one antenna entity.

In operation 730, the generator may generate the first antenna pattern in the designed mask template based on the signal amplitude and the signal phase. In operation 730, the generator may calculate a cost function by comparing the mask template to the first antenna pattern, and determine the first antenna pattern to be a final antenna pattern when a result of the calculation satisfies a predesignated condition. Here, the cost function may be calculated based on a sum of excesses of the first antenna pattern over an upper mask and a lower mask of the mask template. In addition, the predesignated condition may include at least one of a preset calculation iteration number and a preset target result value with respect to the cost function. When the result of the calculation satisfies either of the two conditions, the first antenna pattern may be determined to be a best antenna pattern, and thus determined to be the final antenna pattern. However, in operation 730, in a case in which the result of the calculation does not satisfy the predesignated condition, the generator may reset a position vector with respect to at least one antenna entity included in the antenna array, and recalculate the signal amplitude and the signal phase with respect to the antenna array based on the reset position vector. The generator may iteratively perform operations 720 and 730 until the result of the calculation satisfies the predesignated condition, thereby optimizing the antenna pattern generated by the antenna array more to the mask template.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An antenna pattern synthesizing apparatus, comprising:
   a designer configured to design a mask template based on a performance of a synthetic aperture radar (SAR) system including an antenna array in which a plurality of antennas are arranged in a multidimensional structure; and
   a generator configured to calculate a signal amplitude and a signal phase for the antenna array to generate a first antenna pattern using quantum-behaved particle swarm optimization (QPSO), and generate the first antenna pattern in the designed mask template based on the calculated signal amplitude and the calculated signal phase.

2. The antenna pattern synthesizing apparatus of claim 1, wherein the generator comprises:
   an initializer configured to determine an arrangement size of the antenna array corresponding to the first antenna pattern and at least one entity, and initialize a position vector with respect to the at least one entity; and
   a setter configured to set a local position and a global position with respect to the at least one entity using the QPSO.

3. The antenna pattern synthesizing apparatus of claim 2, wherein the generator is configured to calculate a best position value of the at least one entity based on the local position and the global position, and calculate the signal amplitude and the signal phase of the antenna array corresponding to the first antenna pattern based on the best position value of the at least one entity.

4. The antenna pattern synthesizing apparatus of claim 1, wherein the generator is configured to calculate a cost function by comparing the mask template to the first antenna pattern, and determine the first antenna pattern to be a final antenna pattern when a result of the calculation satisfies a predesignated condition.

5. The antenna pattern synthesizing apparatus of claim 4, wherein the cost function is calculated based on a sum of excesses of the first antenna pattern over an upper mask and a lower mask of the mask template.

6. The antenna pattern synthesizing apparatus of claim 4, wherein the predesignated condition comprises at least one of a preset calculation iteration number and a preset target result value with respect to the cost function.

7. The antenna pattern synthesizing apparatus of claim 4, wherein the generator is configured to reset a position vector with respect to at least one entity included in the antenna array when the result of the calculation does not satisfy the predesignated condition, and calculate the signal amplitude and the signal phase with respect to the antenna array based on the reset position vector.

8. The antenna pattern synthesizing apparatus of claim 7, wherein the generator is configured to iteratively calculate the cost function until the result of the calculation satisfies the predesignated condition.

9. An antenna pattern synthesizing method, comprising:
   designing, via a designer, a mask template based on a performance of a synthetic aperture radar (SAR) system including an antenna array in which a plurality of antennas are arranged in a multidimensional structure;
   calculating, via a generator, a signal amplitude and a signal phase for the antenna array to generate a first antenna pattern using quantum-behaved particle swarm optimization (QPSO);
   wherein the generator and the designer comprise an antenna pattern synthesizing apparatus; and
   generating, via the generator, the first antenna pattern in the designed mask template based on the calculated signal amplitude and the calculated signal phase.

10. The antenna pattern synthesizing method of claim 9, wherein the calculating comprises:
    determining, via the generator, an arrangement size of the antenna array corresponding to the first antenna pattern and at least one entity, and initializing a position vector with respect to the at least one entity; and
    setting, via the generator, a local position and a global position with respect to the at least one entity using the QPSO.

11. The antenna pattern synthesizing method of claim 10, wherein the calculating comprises calculating a best position value of the at least one entity based on the local position and the global position, and calculating the signal amplitude and the signal phase of the antenna array corresponding to the first antenna pattern based on the best position value of the at least one entity.

12. The antenna pattern synthesizing method of claim 9, wherein the generating comprises:
    calculating, via the generator, a cost function by comparing the mask template to the first antenna pattern; and
    determining, via the generator, the first antenna pattern to be a final antenna pattern when a result of the calculation satisfies a predesignated condition.

13. The antenna pattern synthesizing method of claim 12, wherein the cost function is calculated based on a sum of excesses of the first antenna pattern over an upper mask and a lower mask of the mask template.

14. The antenna pattern synthesizing method of claim 12, wherein the predesignated condition comprises at least one of a preset calculation iteration number and a preset target result value with respect to the cost function.

15. The antenna pattern synthesizing method of claim 12, wherein the generating comprises:
   resetting, via the generator, a position vector with respect to at least one entity included in the antenna array when the result of the calculation does not satisfy the pre-designated condition; and
   calculating, via the generator, the signal amplitude and the signal phase with respect to the antenna array based on the reset position vector.

16. A non-transitory computer-readable storage medium storing instructions that, when executed by a processor, cause the processor to perform the antenna pattern synthesizing method comprising the steps of:
   designing a mask template based on a performance of a synthetic aperture radar (SAR) system including an antenna array in which a plurality of antennas are arranged in a multidimensional structure;
   calculating a signal amplitude and a signal phase for the antenna array to generate a first antenna pattern using quantum-behaved particle swarm optimization (QPSO); and
   generating the first antenna pattern in the designed mask template based on the calculated signal amplitude and the calculated signal phase.

* * * * *